US008894284B2

(12) United States Patent
Watson

(10) Patent No.: US 8,894,284 B2
(45) Date of Patent: Nov. 25, 2014

(54) SYSTEM, METHOD, AND APPARATUS FOR HOLDING A TRACK TO A BASE

(71) Applicant: Bishop-Wisecarver Corporation, Pittsburg, CA (US)

(72) Inventor: Nigel S. Watson, Martinez, CA (US)

(73) Assignee: Bishop-Wisecarver Corporation, Pittsburg, CA (US)

( * ) Notice: Subject to any disclaimer, the term of this patent is extended or adjusted under 35 U.S.C. 154(b) by 0 days.

(21) Appl. No.: 13/888,177

(22) Filed: May 6, 2013

(65) Prior Publication Data

US 2013/0239368 A1  Sep. 19, 2013

Related U.S. Application Data

(63) Continuation of application No. 12/643,785, filed on Dec. 21, 2009, now Pat. No. 8,434,946, which is a continuation-in-part of application No. 12/260,754, filed on Oct. 29, 2008, now Pat. No. 8,491,193.

(51) Int. Cl.
*F16C 19/00* (2006.01)
*F16C 29/04* (2006.01)
*F16B 9/02* (2006.01)
*F16C 29/00* (2006.01)

(52) U.S. Cl.
CPC ............. *F16C 29/005* (2013.01); *F16C 29/004* (2013.01); *F16B 9/023* (2013.01); *F16C 29/045* (2013.01)
USPC .................... 384/55; 384/58; 16/96 R; 16/97; 403/374.1

(58) Field of Classification Search
CPC .... F16C 29/004; F16C 29/005; F16C 29/045; F16C 9/023; F16C 12/32; F16B 12/26
USPC ........... 384/50, 53–55, 57–59; 403/73, 374.2, 403/381, 336, 273; 248/307, 313; 52/285.3, 52/474, 460–461, 716.8, 753, 837; 439/716, 532; 16/96 R, 97
See application file for complete search history.

(56) References Cited

U.S. PATENT DOCUMENTS

| 1,470,090 A | 10/1923 | Manning |
| 1,500,118 A | 7/1924 | Ellis |

(Continued)

FOREIGN PATENT DOCUMENTS

| DE | 4109286 | 9/1992 |
| EP | 0258714 B1 | 6/1990 |
| WO | WO-02/38473 | 5/2002 |
| WO | WO-2011/087468 | 7/2011 |

OTHER PUBLICATIONS

"DualVee Motion Technology", Catalog: Components, Technical Specifications, Aug. 2007, 32 pages.

(Continued)

*Primary Examiner* — Marcus Charles
(74) *Attorney, Agent, or Firm* — Brian Beverly; Beeson Skinner Beverly, LLP

(57) ABSTRACT

A support base for securing a linear motion guide track in a defined location comprises an elongated support body having one or more receiving slots, each slot including inwardly extending deformable teeth-like protrusions that deform upon insertion of the guide track into the slot thereby firmly securing the guide track to the support base without the use of traditional fasteners.

5 Claims, 9 Drawing Sheets

(56) References Cited

U.S. PATENT DOCUMENTS

| | | | |
|---|---|---|---|
| 3,039,232 A * | 6/1962 | Dunn | 52/396.04 |
| 3,210,716 A | 10/1965 | Meacham | |
| 3,211,322 A * | 10/1965 | Collons | 220/240 |
| 3,416,282 A | 12/1968 | Daugherty | |
| 3,461,466 A | 8/1969 | Stahlhut | |
| 3,661,431 A | 5/1972 | Wisecarver | |
| 3,768,846 A * | 10/1973 | Hensley et al. | 52/127.5 |
| 3,848,388 A | 11/1974 | Bretche | |
| 3,893,271 A | 7/1975 | Kotlarz | |
| D245,106 S * | 7/1977 | Scheid | D25/125 |
| 4,057,312 A | 11/1977 | Hagermo | |
| 4,497,148 A | 2/1985 | Lopez | |
| 4,694,531 A | 9/1987 | Foy | |
| 4,826,438 A | 5/1989 | Torres | |
| 5,145,418 A | 9/1992 | Moranski et al. | |
| 5,482,026 A | 1/1996 | Russell | |
| 5,513,916 A | 5/1996 | Takei | |
| 5,553,947 A | 9/1996 | Scheib et al. | |
| 5,794,901 A | 8/1998 | Sigel | |
| 5,833,417 A | 11/1998 | Sargent et al. | |
| 5,950,773 A | 9/1999 | Ito | |
| 6,484,997 B1 | 11/2002 | Edwards et al. | |
| 6,634,149 B2 | 10/2003 | Cates et al. | |
| 6,746,055 B1 | 6/2004 | Wood et al. | |
| 6,993,875 B2 | 2/2006 | Rudduck | |
| 7,163,178 B2 | 1/2007 | Ricaud | |
| 2008/0112656 A1 | 5/2008 | Shirai et al. | |
| 2009/0226122 A1 | 9/2009 | Schroeder | |
| 2011/0110616 A1 | 5/2011 | Watson | |

OTHER PUBLICATIONS

"Integral V Linear Guide: Snap-In Series", PSC Linear, Jul. 18, 2008, 2 pages.

* cited by examiner

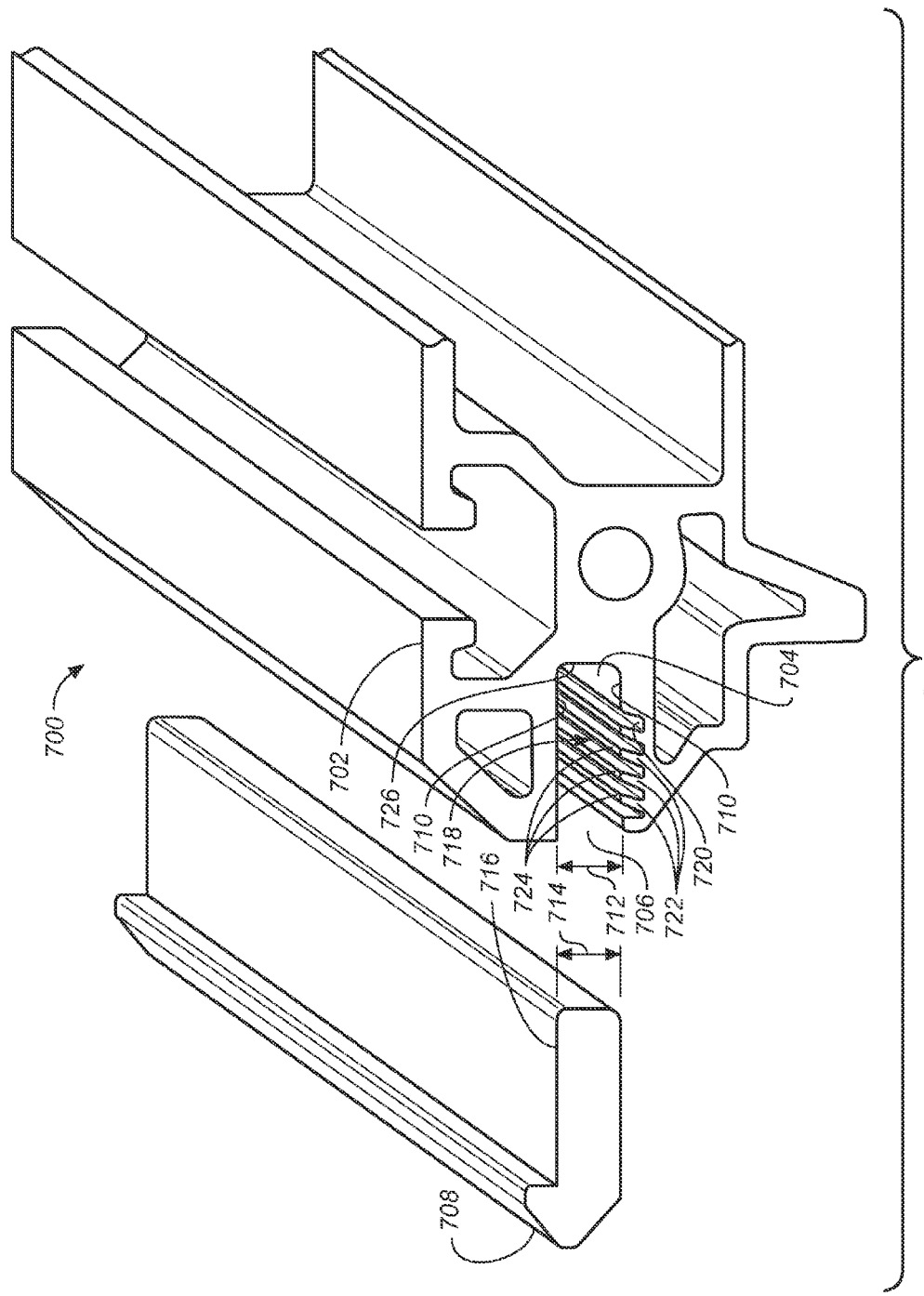

SYSTEM, METHOD, AND APPARATUS FOR HOLDING A TRACK TO A BASE

CROSS-REFERENCE TO RELATED APPLICATIONS

This is a continuation application of application Ser. No. 12/643,785, filed Dec. 21, 2009, now U.S. Pat. No. 8,434,946, which is a continuation-in-part application of application Ser. No. 12/260,754, filed Oct. 29, 2008, now U.S. Pat. No. 8,491,193.

BACKGROUND

1. Field of the Invention

This invention relates generally to assembly of a linear motion guide track in a guided motion system. In particular, the invention relates to a support base for a linear motion guide track having fastening slots including deformable fingers that enable rapid attachment of guide tracks of varying width to the support base without using standard fasteners.

2. Description of the Prior Art

In manufacturing processes and within manufactured capital goods themselves, precise and repeatable motion is useful and often essential. For example, in manufacturing processes ranging from machining to textiles to electronics, tool heads or other items move reciprocally over enormous numbers of cycles and must do so with sustained precision. In other settings, specimens and instrumentation must move precisely and repeatedly relative to each other within laboratory analytic devices to collect data on the samples.

Linear motion guides are used extensively in manufacturing processes and other applications to produce precise reciprocating motion cycles. Linear motion guides are typically supported on extruded support bases. FIG. 1 shows a widely available aluminum extrusion support base 130 manufactured by the Parker Hannifin Corporation, located in Cleveland, Ohio. Similarly, guide tracks and guide wheels are widely available standard articles of manufacture. For example, DualVee® guide wheels and Single Edge guide tracks, both manufactured by Bishop-Wisecarver Corporation, located in Pittsburg, Calif., are time-tested and ideal for a wide variety of applications.

Guide wheels riding on rails attached to support bases comprise one class of guided motion technology that provides precise and repeatable kinematics. For example, U.S. Pat. No. 3,661,431 discloses guide wheels and tracks in which guide wheels cooperate with rails to establish repetitive motion cycles.

An exemplary guided motion assembly shown in FIG. 1 comprises a V-shaped guide track 120 and a DualVee® guide wheel 110 both manufactured by Bishop-Wisecarver Corporation. The track 120 is coupled with a support base 130 using track clamp 125. In the illustrated embodiment of the invention, the support base 130 comprises an extrusion.

Known support bases are typically available in a standard sizes and configurations. For example, the support base 130 shown in FIG. 1 may be an extruded aluminum support base, such as that manufactured by Parker Hannifin Corporation.

Also widely used in the guided motion industry are track clamps for coupling the track with the support base. FIG. 1 illustrates a known track clamp 125 for coupling the V-shaped guide track 120 to a standard extrusion 130. Previous attempts at providing track clamps for standard support bases have been complicated, time consuming, difficult to assemble due to the need for fasteners, expensive, and unreliable due to the use of moving parts, among other shortcomings.

Due to the deficiencies of the prior art, there is a need to provide a reliable, effective and easy-to-assemble guide track system for coupling guide tracks with linear motion support bases.

There is also a need for a method of coupling guide tracks with a standard support base without the use of traditional fasteners.

Likewise, in applications in which the use of fasteners is preferable, uncomplicated, easy-to-assemble, reconfigurable, and universally faster systems are needed.

One drawback of the prior art is that linear motion guide tracks that use fasteners and track clamps are commonly designed for use with a particular base extrusion. For example, many known linear guide tracks are specifically designed to work with the various T-slot extrusions manufactured by Parker Hannifin Corporation. However, such specifically designed track assemblies cannot be used with other extrusion bases or configurations. Therefore, there is a need in the art for a guide track assembly that can be used with any extrusion having a T-slot configuration.

Another drawback to the prior art is that known solutions oftentimes require that the end user cut, drill, or otherwise machine a set of work pieces to initially configure a linear guide system. This is problematic for end users who do not possess a sophisticated machine shop or for those who do not possess the requisite skill to fabricate the required materials.

Furthermore, pre-drilled track is very expensive and requires a user to layout the substrate to which the track is to be assembled in advance. This too is problematic because the user must be especially precise and must have detailed plans well in advance. Moreover, once one particular setup is configured, it cannot be reconfigured without taking apart the entire system.

Another drawback to current linear motion systems is the width profile of a track assembly. For example, known linear motion guides are bulky.

Another significant drawback of the known art is that drilling track and attaching it to a substrate with a plurality of individual fasteners oftentimes results in undulations and imperfections in the linear track. These undulations can negatively affect the entire system.

Likewise, it is difficult to maintain guide tracks in parallel disposition when they are being fastened to a support base. Even a slight deviation of cooperating guide tracks from parallel disposition can negatively affect the performance of a linear motion system.

Some other prior art solutions include simply placing a track directly into a T-slot of a base support extrusion. These known solutions often result in an unacceptably imprecise fit. For example, commercially available base support extrusions will vary in T-slot width for any given mill run. Consequently, a track having a uniform width may fit either too tightly or too loosely within the extrusion's T-slot. Therefore, there is a need to provide a track support extrusion that can reliably accommodate a standard-sized track despite the occasion of small size variances.

SUMMARY OF THE INVENTION

The invention relates to novel approaches to manufacturing and assembling linear motion guide tracks that provide linear motion guide systems that are easy and quick to install. Some embodiments of the invention involve a track clamp that couples with standard linear motion support bases without the use of traditional fasteners.

The elimination of fasteners results in lower cost, faster assembly, and increased structural integrity due to the elimination of drilled and tapped holes in the track. According to some embodiments of the present invention, traditional fasteners are replaced with a track clamp having deformable teeth-like protrusions.

Some embodiments of the invention utilize track clamps having a pressure insert portion with teeth-like protrusions that deform upon coupling with the support base. The deformation of the track clamp teeth ensures a tight fit without the use of traditional fasteners.

Various embodiments of the invention include track clamps designed to couple guide tracks to support bases in a variety of configurations including tracks disposed orthogonally to the support base. In some embodiments of the present invention, track clamps are designed with shoulder extensions to provide increased lateral support to withstand forces bearing on the guide track.

In some embodiments of the invention, the track clamp is designed to suit any slot in a wide variety of extrusions or barstock material. According to one aspect of the present invention, the track clamp enables the user to integrate a V-shaped edge track into the T-slots of different standard structural extrusion support bases.

Some embodiments of the invention disclose low cost methods of installing linear motion guide tracks into structural extrusion support bases. In some embodiments, the track clamp is installed using a soft-headed mallet. In some other embodiments, the track is installed using a cross-head arrangement of rollers to uniformly apply force to insert the track clamp and guide track into standard structural extrusion support bases.

In some embodiments, the track clamp and guide track are assembled in a factory. In some other embodiments, the track clamp and guide track are assembled on-site by an end user.

In some embodiments of the invention, the track clamps are integrated with widely available standard aluminum extrusion support bases. In some embodiments of the present invention, track clamps are especially designed to accommodate various sized V-shaped edge tracks. For example, in some embodiments, the track clamp is designed for tracks sized 0 thru 4, in carbon steel or stainless steel. In some embodiments of the invention, the track and track assembly are chosen to be used with DualVee® guide wheels, manufactured by Bishop-Wisecarver Corporation.

In some embodiments of the present invention, methods of manufacturing track clamps having deformable teeth protrusions are disclosed.

Some embodiments of the invention include a bolt-on track clamp for housing a track and coupling with a support base extrusion.

Some other embodiments include a back-to-back track configuration that is coupled to a proprietary base extrusion using clamping washers.

In yet other embodiments, a support base includes deformable fingers in one or more T-slots enabling insertion and securement therein of guide tracks having varying widths.

These solutions provide customers with a simple-to-assemble, customizable, reconfigurable, user-friendly and space-saving solution for reliable track assembly.

BRIEF DESCRIPTION OF THE DRAWINGS

FIG. 7A is an upper end perspective view of a support base extrusion having a plurality of deformable fingers disposed in a track slot with a track inserted therein according to the invention;

DETAILED DESCRIPTION OF THE INVENTION

Figure 1:
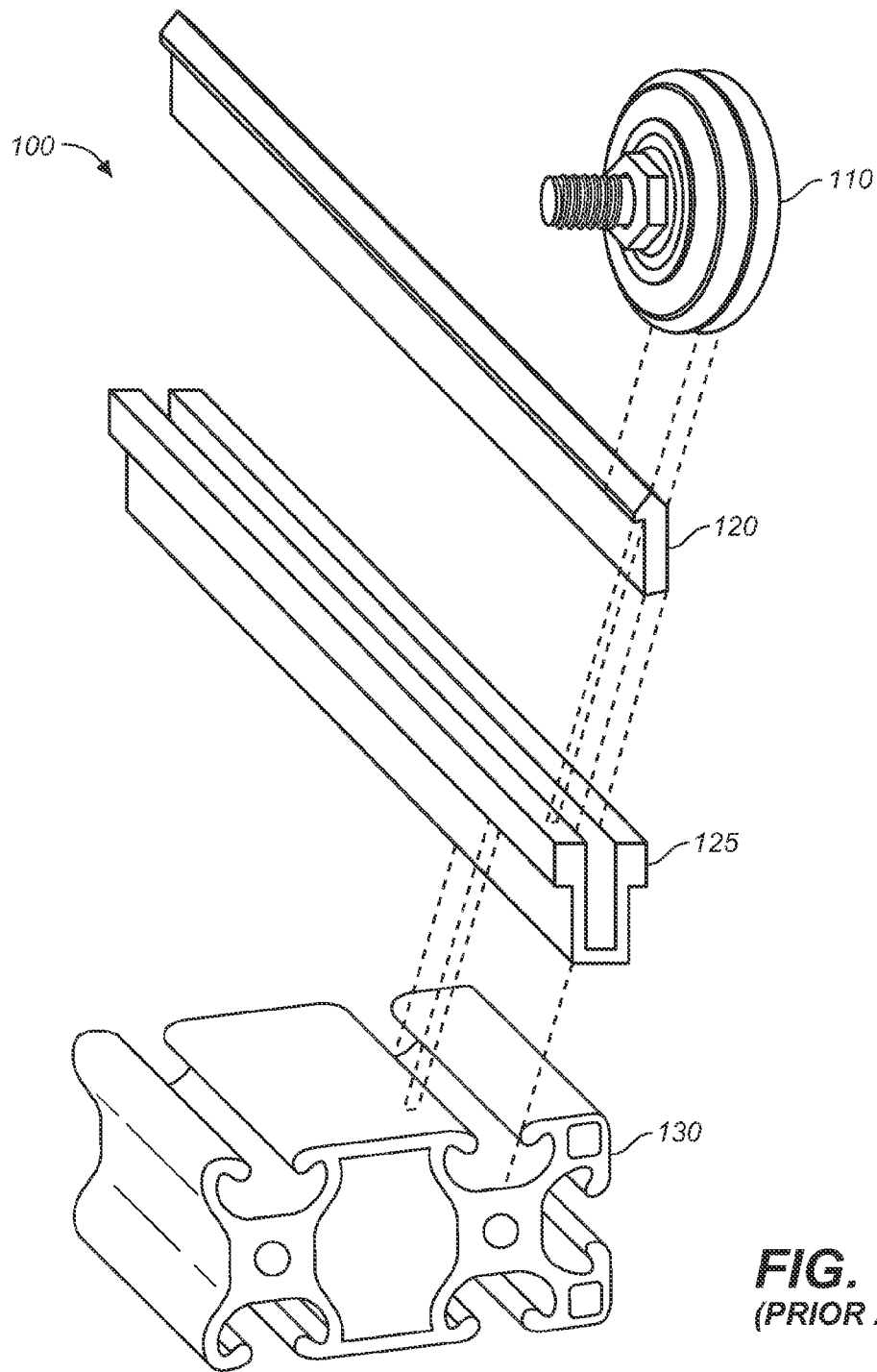
FIG. 1 is an exploded upper perspective view of a guided motion assembly requiring fasteners previously known in the art.
Figure 2A:
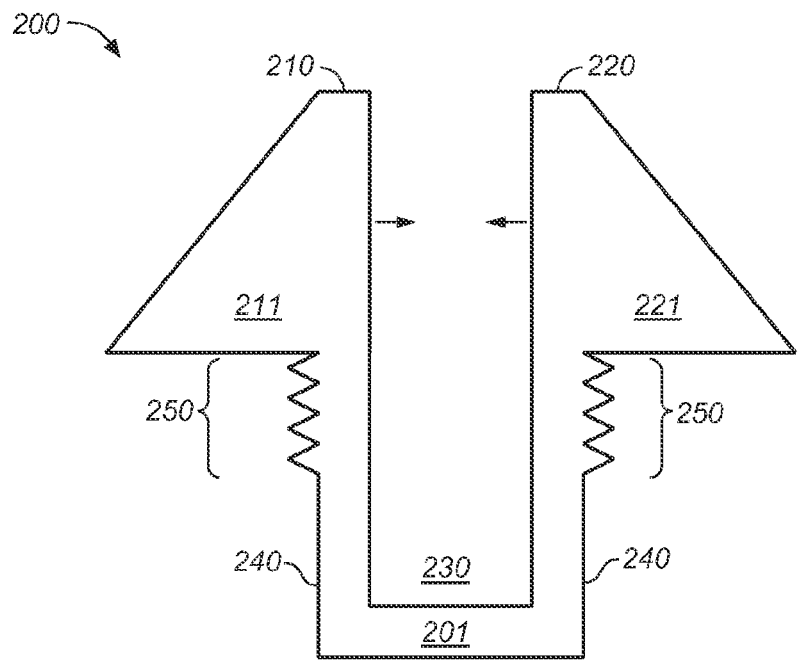
FIG. 2A is an end view of a track clamp according to the invention.
Figure 2B:
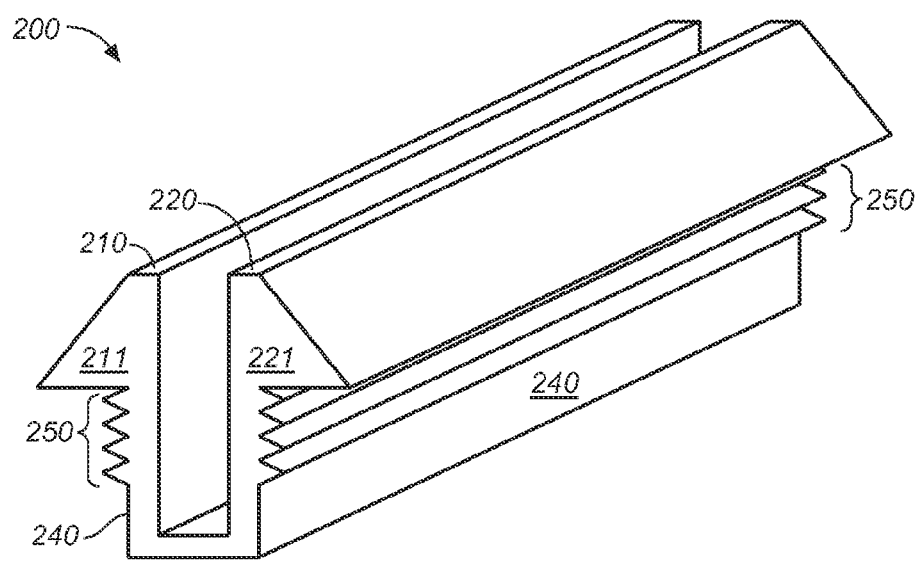
FIG. 2B is an isometric view of the track clamp shown in FIG. 2A.
Figure 2C:
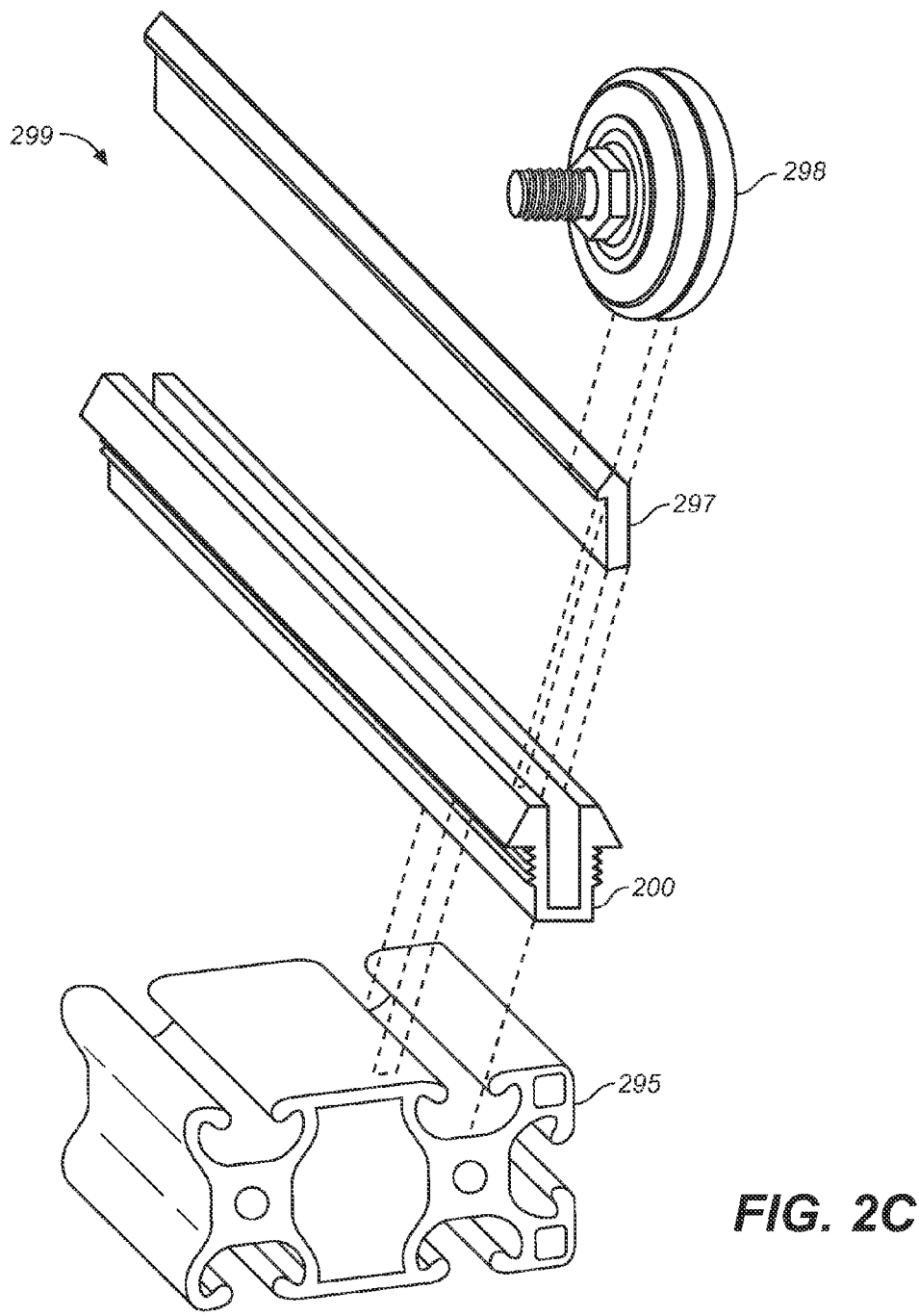
FIG. 2C is an exploded upper perspective view of a guided motion assembly according to the invention.

A track clamp for coupling a linear motion guide track to a support base according to the invention is referred to at 200 in FIGS. 2A-2C. The track clamp 200 comprises two clamp arms 210, 220 which are connected to a base section 201 to form a well 230. As shown, the two arms 210, 220 extend vertically away from the base section 201 and terminate at a fixed distance from the base section 201, thus defining well 230.

The well 230 is configured to accommodate a linear motion guide track 297. Two shoulders 211, 221 are disposed at the end, and on the outer sides of the arms 210, 220. As described, the assembly 200 is configured to be inserted into a support base 295 such that the well is disposed within the support base. Likewise, the support base interacts with the shoulders 211, 221 such that the assembly rests upon the surface of the support base. Additionally, two sets of teeth protrusions 250 are disposed on the outer surfaces 240 of the arms 210, 220. In the illustrated embodiment of the present invention, the teeth protrusions 250 are configured such that they must be deformed to be inserted into a support base, thus coupling with the support base without using fasteners.

The teeth protrusions 250 are deformed and/or sheared by the press-fitting into a support base extrusion 295. Preferably, the deformation of the teeth protrusions 250 causes the arms 210, 220 to be displaced toward each other as indicated by the arrows in FIG. 2A. The displacement clamps a track 297 between the arms 210, 220.

According to one aspect of the invention, the deformation of the teeth protrusions 250 effectuates a cold-pressure solid-state welding process.

A suitable guide wheel 298 is a DualVee® guide wheel manufactured by Bishop-Wisecarver Corporation. A suitable guide track 297 is a V-shaped guide track also manufactured by Bishop-Wisecarver Corporation, designed for use with DualVee® guide wheels.

Figure 3:
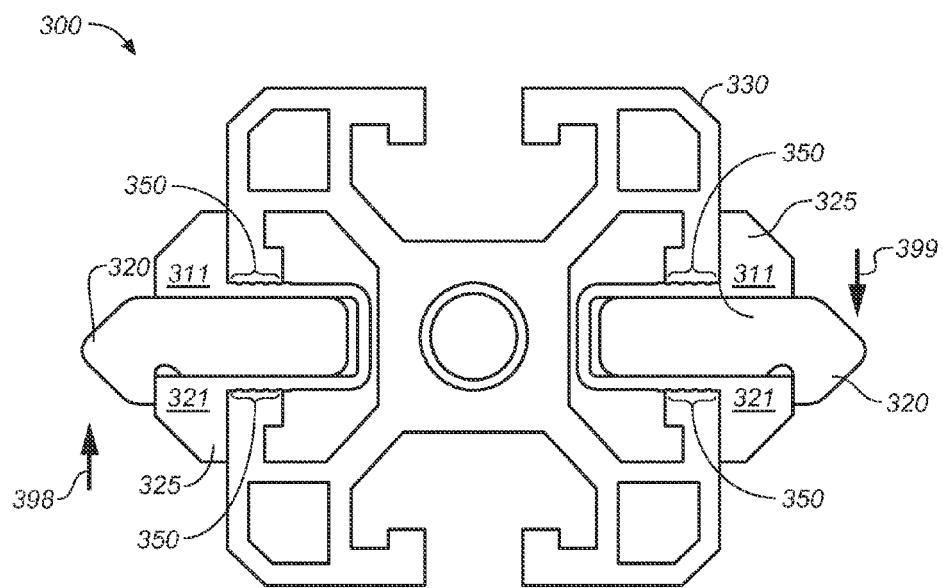
FIG. 3 is an end view of a support base extrusion coupled with a pair of linear motion tracks via track clamps according to the invention.

With reference now to FIG. 3, a track assembly 300 is shown wherein track clamps 325 are press-fitted into a support base 330. In one aspect of the invention, each track clamp 325 is configured such that it is easily coupled with the support base 330 using only hand tools. In the illustrated embodiment of the present invention, the track clamp 325 is configured such that a simple rubber mallet can easily force the track clamp into the support base 330. However, it will be readily apparent to those having ordinary skill in the art that a wide variety of coupling mechanisms can be used.

The simple and secure coupling ability of the invention provides distinct and useful advantages of the approaches known in the art. For example, since linear motion tracks can be easily assembled without expensive and complicated tools, a cost savings is realized. Additionally, the time to install a linear motion track is reduced through the elimination of complicated assembly techniques. By using a track clamp 325 that is compatible with standard extrusions, investment in all new support bases is unnecessary and greater manufacturing consistency is possible. Furthermore, the track clamps 325 of the invention provide a more secure coupling than other coupling techniques that do not use traditional fasteners.

As explained above, teeth protrusions 350 are disposed on the arms 310, 320 of the track assemblies 320. As a result of the press-fitted coupling, the teeth protrusions 350 are deformed, thus ensuring a secure fit between the track clamp 325 and the support base 330. Additionally, the shoulders 311, 321 provide additional support to the track 320. For example, torque applied to the track 320 (indicated with arrows 398, 399) is resisted by the shoulders 311, 321.

It will be readily apparent to those having ordinary skill in the art that the components disclosed in FIG. 3, and in other embodiments of the invention may take various sizes, shapes and appearance. In some embodiments, the arms 310, 320 of the track clamp 325 are spaced between 3 mm and 12 mm apart. In some embodiments, the track 320, the base 330 and the track clamp 325 are between 3 m and 6 m long.

In some embodiments, the track clamp 325, as recited, is substantially comprised of steel. In some embodiments, the track clamp 325 as recited is substantially comprised of stainless steel. In some embodiments the track clamp 325 is formed by extrusion. In some embodiments the track clamp 325 is formed by metal injection molding.

Although FIG. 3 illustrates a support base 330 with two track assemblies 325 and two guide tracks 320, it will be readily apparent to those having ordinary skill in the art, that guide track assemblies in a variety of configurations may be formed according to the invention.

Figure 4:
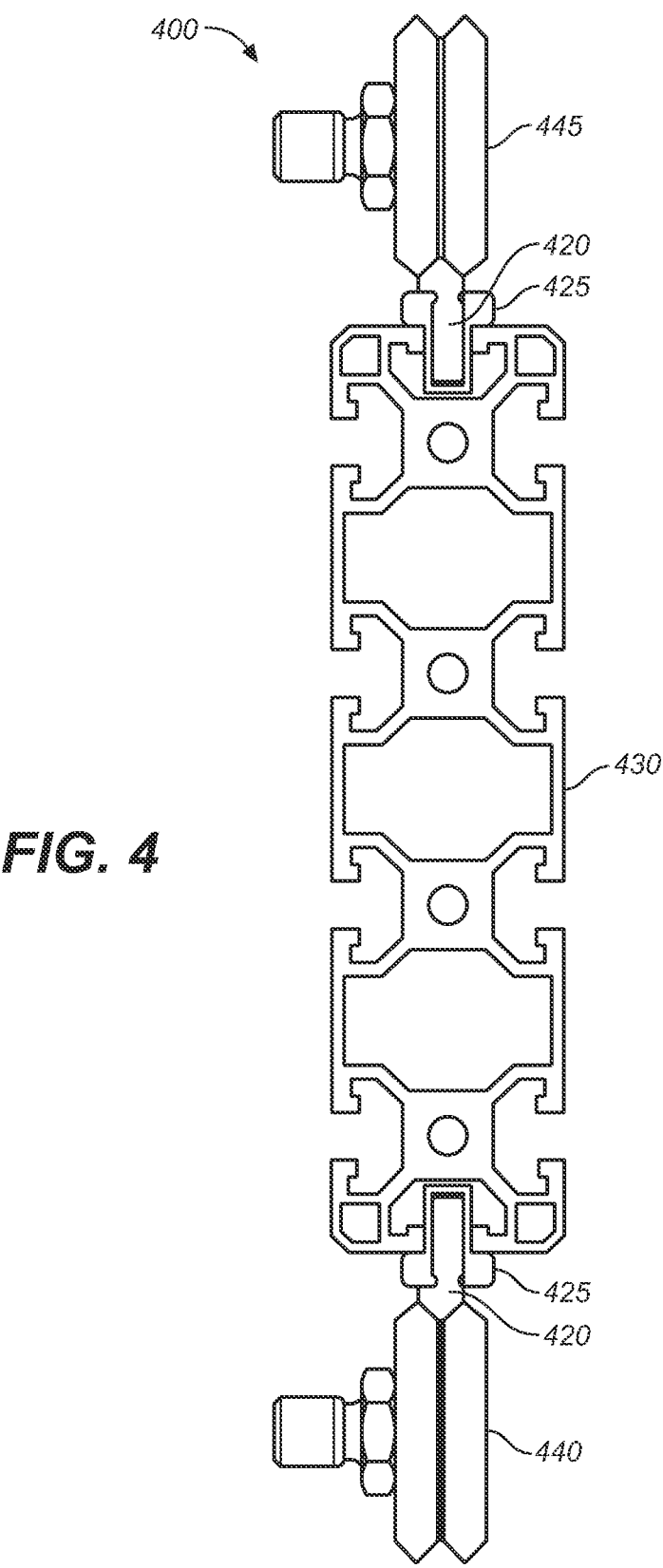
FIG. 4 is an end view of an alternative support base extrusion coupled with a pair of linear motion tracks via track clamps according to the invention.
Figure 5:
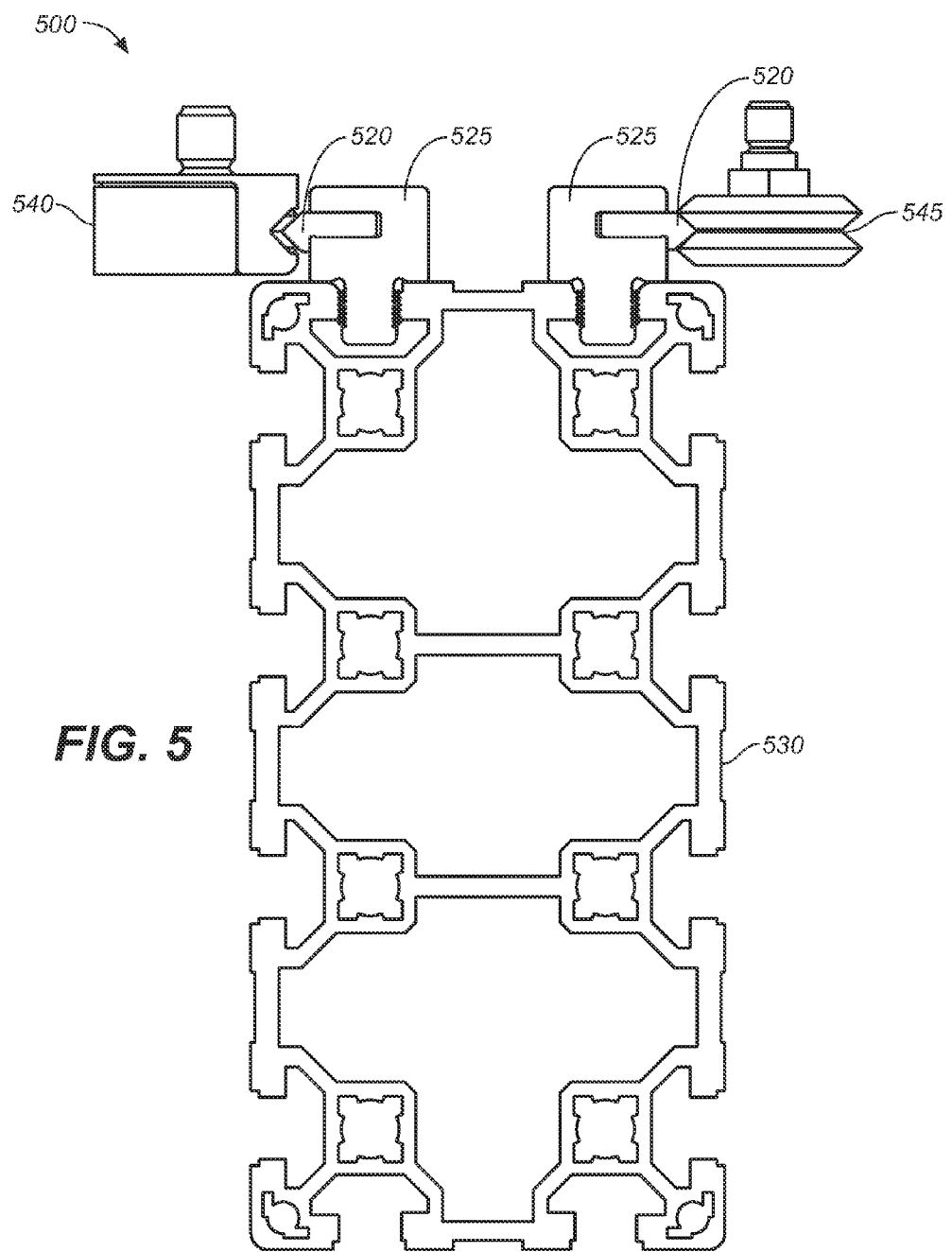
FIG. 5 is an end view of third support base extrusion coupled with a pair of linear motion tracks via track clamps according to the invention.
Figure 6:
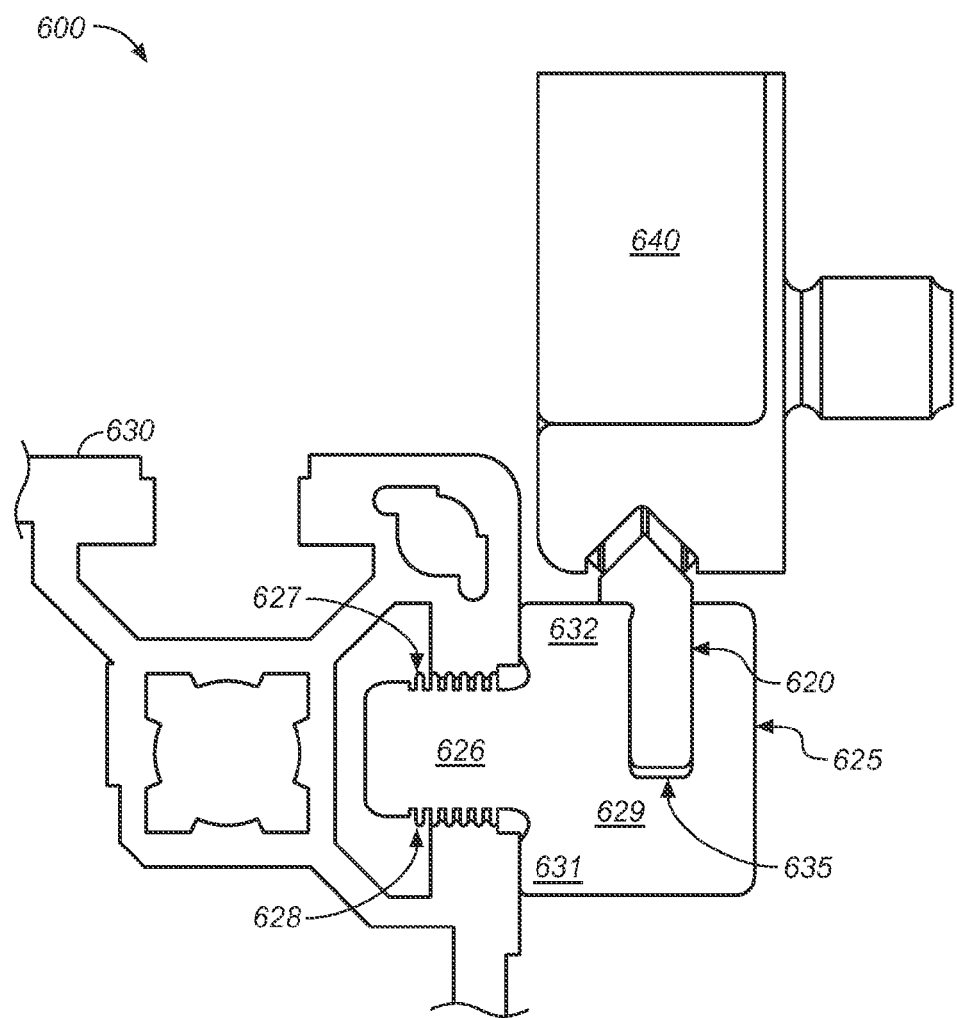
FIG. 6 is an end view of an fourth support base extrusion coupled with a linear motion track via a track clamp according to the invention.

FIGS. 4-6 illustrate several alternate embodiments of linear motion tracks using track assemblies according to the invention.

FIG. 4 shows a linear motion apparatus 400 comprising a support base 430 disposed vertically between two guide wheels 440, 445. The support base 430 is coupled to tracks 420 via assembly 425. One or more teeth protrusions such as those discussed above, although not shown, are disposed on the assembly 425.

FIG. 5 shows another linear motion apparatus 500 comprising a support base 530 disposed between two guide wheels 540, 545. The support base 530 is coupled to tracks 520 via assembly 525. One or more teeth protrusions such as those discussed above, although not shown, are disposed on the assembly 525.

Referring next to FIG. 6, a linear motion apparatus 600 comprising a support base 630 is disposed vertically between two guide wheels 640, 645. The support base 630 is coupled to tracks 620 via track clamp 625. A plurality of teeth protrusions 627, 628 are disposed on the assembly 625.

The track clamp 625 includes a plug section 626 having a plurality of teeth protrusions 627, 628 disposed on the outer side of the plug section 626. Additionally, the plug section 626 includes a cap section 629 coupled to the plug section 626 wherein the cap section 629 is at least partially wider than the plug section, forming shoulders 631, 632 which rest upon the surface of the support base 630 when the track clamp 625 is coupled with the base section 630. Furthermore, a well 635 is disposed in the cap section 629 configured to hold the track 620 therein. According to some embodiments of the present invention, and as shown in FIG. 6, the orientation of the well 635 within the cap section 629 is substantially orthogonal to the orientation of the plug section 626. In some embodiments of the invention, the cap section 629 and the plug section 626 form an integral whole.

Figure 7B:
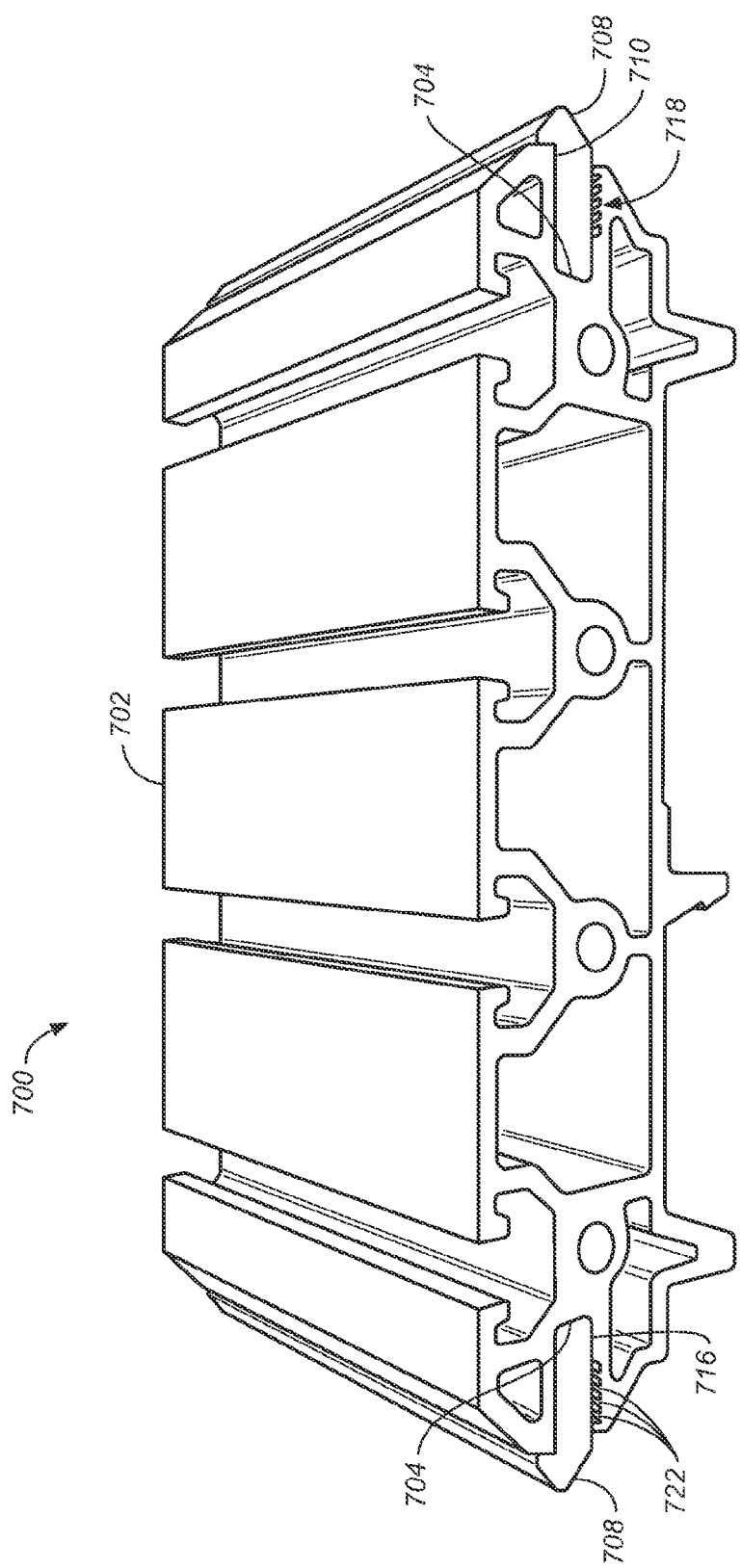
FIG. 7B is an upper isometric view of support base extrusion having a plurality of deformable fingers disposed in oppositely disposed track slots, each track slot having a track inserted therein, according to the invention.

Other embodiments of the invention include a custom-made, snap-in support base extrusion for holding a track without the use of an assembly or without using fasteners. FIGS. 7A and 7B illustrate some other embodiments of the invention which include a snap-in support base extrusion 700.

As explained above, some other prior art solutions include simply placing a track directly into a T-slot of a base support extrusion. These known solutions results in an unacceptably imprecise fit. For example, T-slots in commercially available base support extrusions will vary in width for any given mill run. Therefore, a track having a uniform width will either fit to tightly or too loosely within the slot. A solution to this problem is addressed by creating a plurality of deformable fingers in a track slot that elastically and/or plastically deform when a track is inserted into the slot, thereby resisting the removal of the track and ensuring a tight fit despite variations in track or slot size.

With reference now to FIGS. 7A-7B, another embodiment of the invention, referred to at numeral 700, is shown wherein deformable protrusions are provided in one of the slots of a support base 700. The support base comprises an elongated support body 702 having one or more outwardly opening receiving slots 704. Each slot 704 includes two slot walls 710 defining a slot width 712 that is slightly wider than the beam width 714 of the retention beam 716 of the guide track 708. The retention beam 716 is thus closely retained, when inserted in the receiving slot 704.

At least one of the slot walls 710 of retention slot 704 has a recessed portion 718 including an inset wall 720 from which project inwardly a plurality of teeth-like projections 722. The ends 724 of the projections 722 extend into the slot such that they are spaced from the opposing slot wall 710 a distance less than the width 714 of the retention beam 716. In the illustrated embodiment, the projections are inclined away from the slot's opening 706 and toward the inner end 726 of the slot. Those of skill in the art will appreciate, however, that in other embodiments the projections could be disposed perpendicularly to the inset wall 720.

The invention is practiced by insertion of the retention beam 716 of a guide track 708 into the retention slot 704. As the retention beam 716 is pressed into the slot 704, projections 722 deform and anchor the retention beam in the slot thereby securing the guide track 708 to the support body 702 without the need for traditional fasteners.

A particular advantage to the embodiment shown in FIGS. 7A-7B is that guide tracks of varying dimensions can be inserted into the retention slot. The projections will deform corresponding to the width of the guide track, thus forgiving dimension variances in the guide track and resulting in a secure joinder of the guide track to the support base.

The invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications can be made in the embodiment chosen for illustration without departing from the spirit and scope of the invention. Specifically, it will be apparent to one of ordinary skill in the art that the device and method of the invention could be implemented in several different ways and have several different appearances.

The invention claimed is:

1. A support base for securing a linear motion guide track, the guide track having a retention beam including two oppositely-facing retention beam walls defining a beam width, the support base comprising:

an elongated support body having one or more outwardly opening receiving slots, each of said slots having two opposing slot walls, one or both of said slot walls including a recessed portion having an inset wall and one or more deformable teeth-like protrusions extending inwardly from said inset wall, the protrusions of each of said one or both slot walls spaced from the other of said slot walls a distance less than the beam width, such that insertion of the retention beam of a guide track into one of said one or more slots deforms the one or more protrusions of said slot thereby securing the guide track to said support body.

2. The support base of claim 1 wherein:
said one or more receiving slots each define an outer opening, and said protrusions are inclined away from said opening.

3. The support base of claim 1 wherein:
said support base is extruded.

4. A support base for securing a linear motion guide track, the guide track having a retention beam including two oppositely-facing retention beam walls defining a beam width, the support base comprising:

an elongated support body having one or more outwardly opening receiving slots, each of said slots having an opening and two opposing slot walls, one of said slot walls having a recessed portion including an inset wall, a plurality of deformable teeth-like protrusions extending inwardly from said inset wall at an inclination away from said opening, said protrusions having free ends spaced from the other of said slot walls a distance less than the beam width, such that insertion of the retention beam of a guide track into one of said one or more slots deforms said protrusions thereby anchoring the retention beam in said slot and securing the guide track to said support body.

5. A support base for securing a linear motion guide track, the guide track having a retention beam comprised of steel or stainless steel and including two oppositely-facing retention beam walls defining a beam width, the support base comprising:

an elongated support body comprised of steel or stainless steel having one or more outwardly opening receiving slots, each of said slots having two opposing slot walls, one or both of said slot walls including one or more inwardly extending deformable teeth-like protrusions, the protrusions of each of said one or both slot walls spaced from the other of said slot walls a distance less than the beam width, such that insertion of the retention beam of a guide track into one of said one or more slots deforms the one or more protrusions of said slot thereby securing the guide track to said support body.

* * * * *